United States Patent
Koerner et al.

(10) Patent No.: US 7,167,784 B2
(45) Date of Patent: *Jan. 23, 2007

(54) METHOD AND SYSTEM FOR CONTROLLING AND/OR REGULATING OPERATING SEQUENCES IN A MOTOR VEHICLE IN A BRAKE SYSTEM

(75) Inventors: Gotthilf Koerner, Weissach (DE); Dietmar Enke, Besigheim (DE); Ulrich Gottwick, Stuttgart (DE); Michael Schubert, Althengstett (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,201

(22) PCT Filed: Jul. 10, 1999

(86) PCT No.: PCT/DE99/02136

§ 371 (c)(1),
(2), (4) Date: Jul. 17, 2000

(87) PCT Pub. No.: WO00/18625

PCT Pub. Date: Apr. 6, 2000

(65) Prior Publication Data

US 2002/0183902 A1 Dec. 5, 2002

(30) Foreign Application Priority Data

Sep. 25, 1998 (DE) ................. 198 43 861

(51) Int. Cl.
*G06F 19/00* (2006.01)

(52) U.S. Cl. ..................................... 701/29

(58) Field of Classification Search ............ 701/29–31, 701/36, 39, 43, 48, 67, 70–79, 82–88, 90–93, 701/100–101, 107; 180/197, 284, 301, 305–308, 180/337, 370; 303/10–11, 121–122, 122.01–122.06, 303/123, 125, 145, 155, 157–158, 175–176, 303/191–192, 84.1–84.2, 900–901, 79.52, 303/276, 266, 270–272

See application file for complete search history.

(56) References Cited

U.S. PATENT DOCUMENTS 3,909,071 A * 9/1975 Klatt ........................ 303/194

(Continued)

FOREIGN PATENT DOCUMENTS

DE 41 42 580 6/1993

(Continued)

OTHER PUBLICATIONS

Patent Abstracts of Japan, vol. 1996, No. 01, Jan. 31, 1996 & JP 07 242168A (Fujitsu Ten Ltd.) Sep. 19, 1995*.

(Continued)

*Primary Examiner*—Thu V. Nguyen
(74) *Attorney, Agent, or Firm*—Kenyon & Kenyon LLP (57) ABSTRACT

Methods and a system of controlling and/or regulating operating sequences in a brake system of a vehicle having an electronic circuit and/or control which controls and/or regulates the operating sequences and having consumers in the control and the brake system and at least one temperature detection means arranged in thermal contact with at least part of the electronic circuit and/or part of the brake system. A temperature value representing the temperature of this part is detected, and the system determines whether the temperature value exceeds at least one threshold value, where at least one measure is initiated, to reduce the temperature or to retard or stop the increase in temperature.

5 Claims, 5 Drawing Sheets

U.S. PATENT DOCUMENTS

| | | | |
|---|---|---|---|
| 4,161,339 A * | 7/1979 | Kawaguchi et al. | 303/9.68 |
| 4,626,043 A * | 12/1986 | Belart et al. | 303/114.1 |
| 4,950,037 A * | 8/1990 | Kopper et al. | 303/166 |
| 5,524,974 A * | 6/1996 | Fischle et al. | 303/191 |
| 5,648,759 A | 7/1997 | Miller et al. | |
| 5,735,585 A * | 4/1998 | Koike et al. | 303/145 |
| 5,744,921 A * | 4/1998 | Makaran | 318/254 |
| 5,818,679 A * | 10/1998 | Schustek et al. | 361/154 |
| 5,897,596 A * | 4/1999 | Kabune et al. | 701/29 |
| 6,088,631 A * | 7/2000 | Kuehn et al. | 701/1 |

FOREIGN PATENT DOCUMENTS

| | | |
|---|---|---|
| DE | 44 07 051 | 9/1995 |
| DE | 195 23 108 | 11/1996 |
| DE | 196 33 952 | 2/1997 |
| DE | 195 48 248 | 6/1997 |
| DE | 196 15 449 | 10/1997 |
| DE | 196 40 383 | 4/1998 |
| EP | 0 175 843 | 4/1986 |
| JP | 9 123894 | 5/1997 |

OTHER PUBLICATIONS

Patent Abstracts of Japan, vol. 1996, No. 02, Feb. 29, 1996 & JP 07 251731A (Nippondenso Co. Ltd.), Oct. 3, 1995*.

Patent Abstracts of Japan, vol. 1999, No. 01, Jan. 29, 1999 & JP 10 278771A (Toyota Motor Corp.), Oct. 20, 1998*.

* cited by examiner

METHOD AND SYSTEM FOR CONTROLLING AND/OR REGULATING OPERATING SEQUENCES IN A MOTOR VEHICLE IN A BRAKE SYSTEM

FIELD OF THE INVENTION

The present invention relates to methods and a system for controlling and/or regulating operating sequences in a motor vehicle.

BACKGROUND OF THE INVENTION

Conventional brake systems having control units and electronic components, use structural measures and/or cooling elements to cool the electronic components. In addition, the components in automotive engineering can usually withstand loads up to certain temperatures for a limited period of time. The required load profiles for engine space conditions are met with component specifications for temperatures up to 140° C., for example. At very high temperatures (e.g., more than 140° C.), the electronic components are thermally overloaded and destroyed.

In addition, there is a variety of conventional control units, available in particular for controlling a brake system of a motor vehicle. Many variations of such brake systems are known. Such a brake system has at least one brake circuit in which there is at least one means for conveying the pressure medium, e.g., a pump, which is also known as a return pump, in hydraulic brake systems. In addition, optionally at least one more means, for conveying the pressure medium, in particular a self-priming supercharge pump may be provided, which is connected to a supply tank for the pressure medium by a suction line. The intake and outflow of pressure medium in the brake circuit and the intake and outflow of pressure medium in the respective wheel brake cylinder are controlled by cutoff elements, in particular valves, for intake and/or outflow and/or through-flow of pressure medium.

This arrangement is also used in principle in an electrohydraulic brake system, as described in German Patent Application No. 195 48 248 , in which the pressure medium is supplied to valves and comes from valves through a pump with an intermediate accumulator. The pressure medium is then introduced into the wheel brake cylinders or drained out of them, thus regulating the brake pressure, by the opening and closing of the inlet and outlet valves according to the driver's braking request and/or the control signals of a logical switching system such as an anti-lock brake system (ABS), a traction control (ASR), a driving dynamics control (FDR, ESP) or an adaptive cruise control (ACC). With an electrohydraulic brake system, the brake pressure and/or the system pressure is controlled electrically by the control for the cutoff devices for the inflow and/or outflow and/or through-flow of the pressure medium and/or by the means conveying the pressure medium. Likewise, this is implemented with a hydraulic brake system with hydraulic power-assisted braking and a pneumatic brake system.

Complete brake systems with such control units are described in, for example, Bosch "Automotive Handbook," 22$^{nd}$ edition, pages 624–677.

With the conventional brake systems, different methods can be implemented for controlling the brake system.

German Patent Application No. 195 48 248 describes a method and device for controlling a pump in an electrohydraulic brake system, in which the pump can be controlled with a mark-to-space ratio, i.e., a clock ratio, which can be predetermined according to demand. For example, control of the brake pressure in certain situations and the associated driving of, for example, valves or pumps required for this are also known with traction control (ASR), an anti-lock brake system (ABS), driving dynamics control (FDR, ESP), an adaptive cruise control (ACC) or hydraulic power-assisted braking (HBV).

Finally, German Patent Application No. 196 15 449 describes a method and a device for controlling the brake system of a vehicle so that the driver's braking request is formed from a pressure of the brake system which can be influenced by the driver, and the brake system is controlled as a function of the driver's braking request. Another conventional method of detecting the driver's braking request is by the analysis of brake pedal movement.

SUMMARY

The components in automotive engineering are specified for temperatures up to 140° C., for example, for a limited period of time. Nevertheless, heating in the control unit causes the lifetime of the electric components to be shortened and ultimately leads to thermal destruction due to the methods and control and/or regulation to be used as mentioned above. In addition, when components are heated, their resistance increases, which can lead to a reduction in the maximum current flowing and thus possibly to a loss of function. High ambient temperatures in the engine compartment, for example, also have a negative effect. Heating in the control unit and/or in the electronic circuit and/or in the entire brake system occurs due to flowing currents and/or mechanical processes such as friction, for example.

Since heating is greater with active control than in a passive state, less heating can be expected with the relatively short actions in driving dynamics control (FDR, ESP) or an anti-lock brake system (ABS), for example, than is the case with traction control (ASR), for example, where the control procedure is active over a longer period of time, e.g., up to one minute. In addition, if the brake system is also designed in the form of an electrohydraulic brake system (EHB) and/or with hydraulic power-assisted braking (HVB), the control measures may remain active for a much longer period of time, e.g., for up to one hour.

In general, especially with longer acting, active control measures, regardless of the control measure or the system (e.g., ABS, FDR, ASR, EHB, HBV, etc.), the heating of components is no longer negligible and thus, must be minimized through appropriate measures.

According to the present invention the control unit and/or the brake system enters at least one low-power mode when at least one temperature limit is exceeded. Low-power mode is understood to be, for example, a mode in which control measure(s) operate(s) at a reduced power loss. The critical temperature can be detected by a temperature detector, in particular sensors arranged at least partially in thermal contact and/or temperature determination methods, e.g., a temperature estimation model, and/or by analysis of typical functional temperature-dependent changes, such as the vibration response of pressure controllers at high temperatures. If it reaches at least one predeterminable temperature limit, heat-generating controllers are operated in a condition which minimizes power loss.

In addition, it is possible to use not just one temperature limit but instead multiple temperature thresholds, where exceeding such a temperature threshold leads to appropriate measures or at least one measure with certain functionalities and/or control methods.

A reduction in power loss can be achieved specifically with a brake system according to the present invention through specific pump control and/or adapted brake pressure and/or system pressure control and/or appropriate valve control and/or with function cutoff and/or modification of brake command detection.

In addition to using components with a low power loss and introducing structural measures or using heat sinks, these methods offer a possibility of significantly reducing the temperature increase specifically in a control unit, in particular in a brake system and/or lowering the saturation temperature with extremely long control or long control measures. The temperature in the control unit and/or in the brake system can be lowered and/or an increase can be retarded or prevented. This makes it possible to maintain functioning, optionally with minor restrictions in functionality, even under conditions which previously would not have allowed continued operation. In addition, by using these methods, it will be possible to avoid the above-mentioned structural changes in or on the control unit and/or installation of a heat sink to improve dissipation of heat.

Additionally, it could also be possible to use components specified for a lower maximum temperature, thus offering a cost reduction potential.

DETAILED DESCRIPTION

In the exemplary embodiments, two brake systems are used as an example of hydraulic, pneumatic, electrohydraulic and hydraulic power-assisted brake systems mentioned in the related art. The present invention can thus be implemented with minor variations in all the respective systems.

Figure 1:
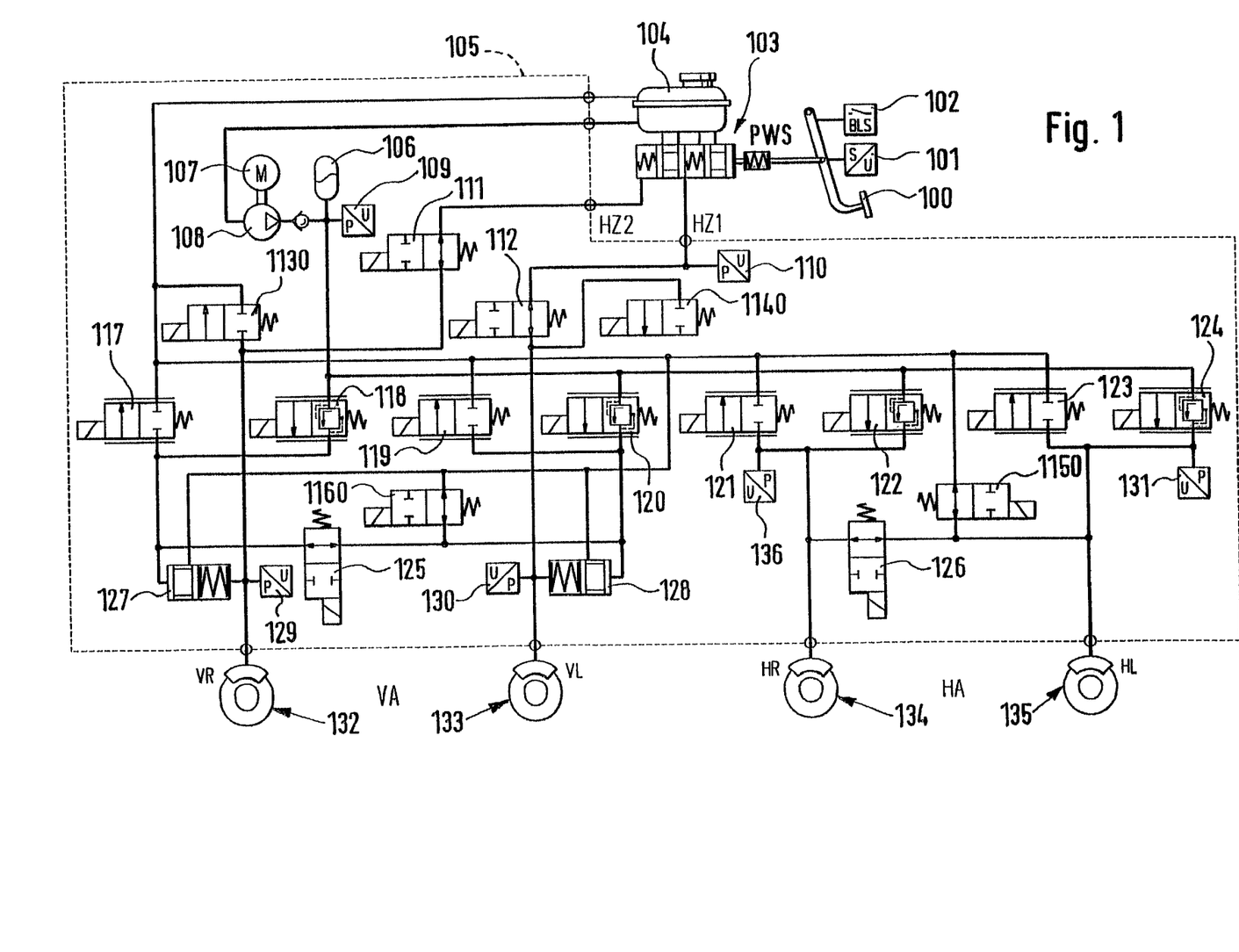
FIG. 1 shows as an example an electrohydraulic brake system.

FIG. 1 illustrates an example embodiment of an electrohydraulic brake system, showing a main brake cylinder 103 having a reservoir 104. A brake pedal 100 operated by the driver is connected to main brake cylinder 103. A pedal travel simulator PWS is connected between brake pedal 100 and main brake cylinder 103. The pedal travel simulator PWS simulates an opposing force for the driver when the brake pedal is operated.

Brake pedal 100 is connected to a brake pedal switch 102 which closes when the brake pedal is operated. In addition, a measurement device 101 for detecting the deflection of the brake pedal is provided on the brake pedal or the piston rod connected to it. A hydraulic unit 105 contains valve and pump arrangements for controlling wheel brakes 132 to 135 and the pressure medium.

In the example embodiment, two brake circuits HZ1 and HZ2 are connected to the main brake cylinder. A block valve 111 or 112 connected to these brake circuits is closed by electric current flow with an electrically controlled brake system. The pressure applied by the driver in operating the brake pedal can be detected by pressure sensor 110 in at least one brake circuit upstream from the block valve. If these block valves 111, 112 are closed by electric power flow, main brake cylinder 103 is separated hydraulically from the pressure control system.

These pressure control systems contain a pressure modulator for each wheel brake 132 through 135 for regulating the brake pressure. V with the wheel brakes stands for front and H stands for rear. Thus, the wheel brakes here are labeled, for example, as VR 132 for the right front, VL 133 for the left front, HR 134 for the right rear and HL 135 for the left rear. The complete axles are labeled as VA for the front axle and HA for the rear axle.

The respective pressure modulators each contain an inlet valve 118 or 120 or 122 or 124. In addition, each has one outlet valve 117 or 119 or 121 or 123. Furthermore, one pressure sensor 129 or 130 or 136 or 131 is contained in each such pressure modulation device to measure the pressure in the line leading to the wheel brake. The plurality of pressure sensors (e.g. another sensor 109 is provided at the outlet of accumulator 106) may be supplemented or replaced by the use of at least one estimation model for the prevailing pressure conditions. In such an estimation model, the delivery volume and/or the pressure in the pressure medium is/are deduced, for example, from the pump rpm, the valve opening and closing times, etc. In both front wheel pressure modulators, there is one media separation piston 127 and 128 between the valves and respective pressure sensor 129 or 130 and/or the respective wheel brake 132 or 133. The respective pressure modulators are connected by equalizing valves 125 and 126 which are controlled independently of one another when current is flowing. When no current is flowing, these equalizing valves are opened, creating a connection between two wheel brakes.

In addition, optional relief valves 1160 and 1150 are provided on each axle, permitting a buildup of pressure from the wheel pressure modulators on one axle when no current is flowing. This establishes a connection of the pressure modulators on one axle with the return lines for the pressure medium leading to reservoir 104. In the electrically controlled operating state, these two valves 1150 and 1160 are permanently energized, i.e., closed, which is why these are provided optionally and can be omitted if, for example, faster pressure equalization is sacrificed.

A temperature compensation valve 1130 or 1140 is optionally also provided for each front wheel pressure modulator. When not carrying a current, these valves 1130 and 1140 are closed, and they are opened by being energized to build up a pressure from the pressure modulator of a front wheel when certain conditions prevail, e.g., a very long braking time and therefore a resulting, long control action. The brake line to the respective wheel brake is connected to the return line by temperature compensation valves 1130 and 1140. These valves 1130 and 1140 specifically compensate for the pressure conditions at high temperatures, caused by the long braking time, for example, but they may also be omitted if the increase in temperature is suppressed by other measures or by a shorter braking time, for example.

The energy required for brake pressure modulation is obtained from at least one pump 108 driven by motor 107. A receiver 106 for the pressure medium is connected downstream as an intermediate buffer, with the pressure prevailing in receiver 106 being detected by a pressure sensor 109. The pressure line coming away from pump 108 leads to inlet valves 118, 120, 122 and 124 of wheel brakes 132 to 135. On the intake end, pump 108 is connected to reservoir 104. Additional details are shown in the hydraulic circuit of the preferred embodiment illustrated in FIG. 1.

With the methods and systems according to the present invention, the shape of individual valves or all valves or valve arrangements may also be varied, just as when multiple pumps are used, their position and/or drive structure may be varied by at least one motor. The procedure according to the present invention described below, however, maybe used to advantage not only in conjunction with such a brake system, but may be used with any brake system in a vehicle. The brake system according to FIG. 1 is shown only as an example.

Figure 2:
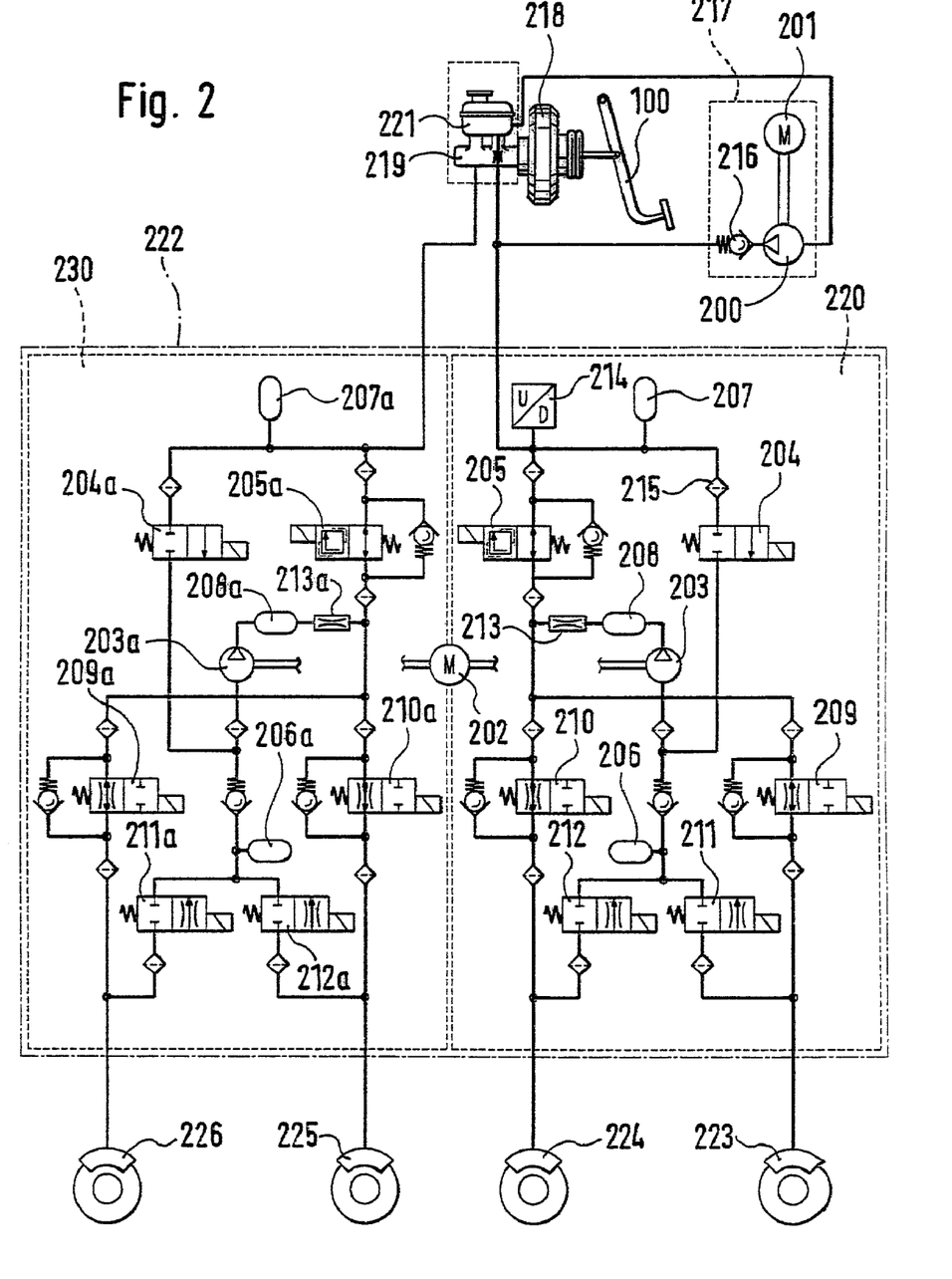
FIG. 2 also shows as an example a hydraulic brake system used with an anti-lock brake system or with driving dynamics control.

The hydraulic brake system according to FIG. 2 is also shown as an example with respect to many brake systems. In particular, a brake system having power-assisted brake system 218 is shown here. When using hydraulic power-assisted braking, for example, this power-assisted brake system 218 is replaced by hydraulic power-assisted braking, so a higher pressure is possible in comparison with the pressure available to the driver with power-assisted braking.

In this embodiment, a brake pedal 100 can be operated by the driver. This brake pedal 100 is connected to main brake cylinder 219 by a piston rod and the abovementioned power-assisted brake system 218. Reservoir 221 is also connected to the main brake cylinder. Block 217 is a booster pump arrangement composed of pump motor 201, booster pump 200 itself and a non-return valve 216 which is provided for safety reasons. To further simplify the diagram, all safety valves in this figure are shown in the form of non-return valve 216. However, this is not necessary according to the present invention, and thus different valves or combinations of valves may be used in conjunction with this safety function, depending on the situation. The use of different valves or valve combinations in conjunction with the respective functionality of the valves as shown in FIGS. 1 and 2 also applies to all the other valves. Hydraulic unit 222 illustrated in FIG. 2 contains two brake circuits 220 and 230. Only one brake circuit is described in detail below; similar elements in the brake circuit not described explicitly are labeled with suffix 'a' and the identical numbers. Like safety valves 216, filters 215 in the drawing are not labeled separately but are combined under 215. The arrangement of filters used here is also not obligatory, and instead any filters that meet the requirements accordingly can be used.

In brake circuit 220 described here, a pressure sensor 214 is also provided on the main brake line. A storage chamber 207 also sits on the main brake line. Pressure medium is introduced into the brake circuit through a booster valve 204. These controllable multi-way valves 204 and 204a are designed, for example, as electromagnetically controllable 2/2-way valves and are mounted between main brake cylinder 219 and return pump 203. As in FIG. 1, the specific design of the individual valves and valve arrangements may vary. Damper chamber 208 is connected at the output of return pump 203. Throttle 213 follows in the direction of main brake cylinder 103 and the respective brake pressure buildup valves, i.e., inlet valves 209, 210 to the wheel brakes. The outlet of the pressure medium from the brake circuit is controlled by a combination of reversing valve and pressure limiting valve 205. This combination will henceforth be referred to simply as reversing valve 205. This reversing valve 205 can be bypassed by a non-return valve so that pressure can be propagated from main brake cylinder 219 as far as the valve arrangements to brake pressure modulation 209 to 212 with sufficient operation of brake pedal 100 when the system is switched to automatic braking mode. Of these brake valve arrangements for brake pressure modulation, there are inlet valves 209 and 210 for the respective wheel brakes 223 to 224 and outlet valves 211 and 212. In addition, an accumulator 206 is also provided on the pressure line leading from outlet valves 211 and 212 to return pump 203. Return pump 203 itself is driven by a motor 202. As is the case here, one motor may be provided for both return pumps of the brake circuits or a separate motor may be provided for each pump. Since this arrangement is shown only as an example in FIG. 2, a separate return pump with its own pump motor may be provided for each wheel brake 223 through 226. For details of the hydraulic circuit, reference is made here to the embodiment illustrated in FIG. 2.

Figure 3:
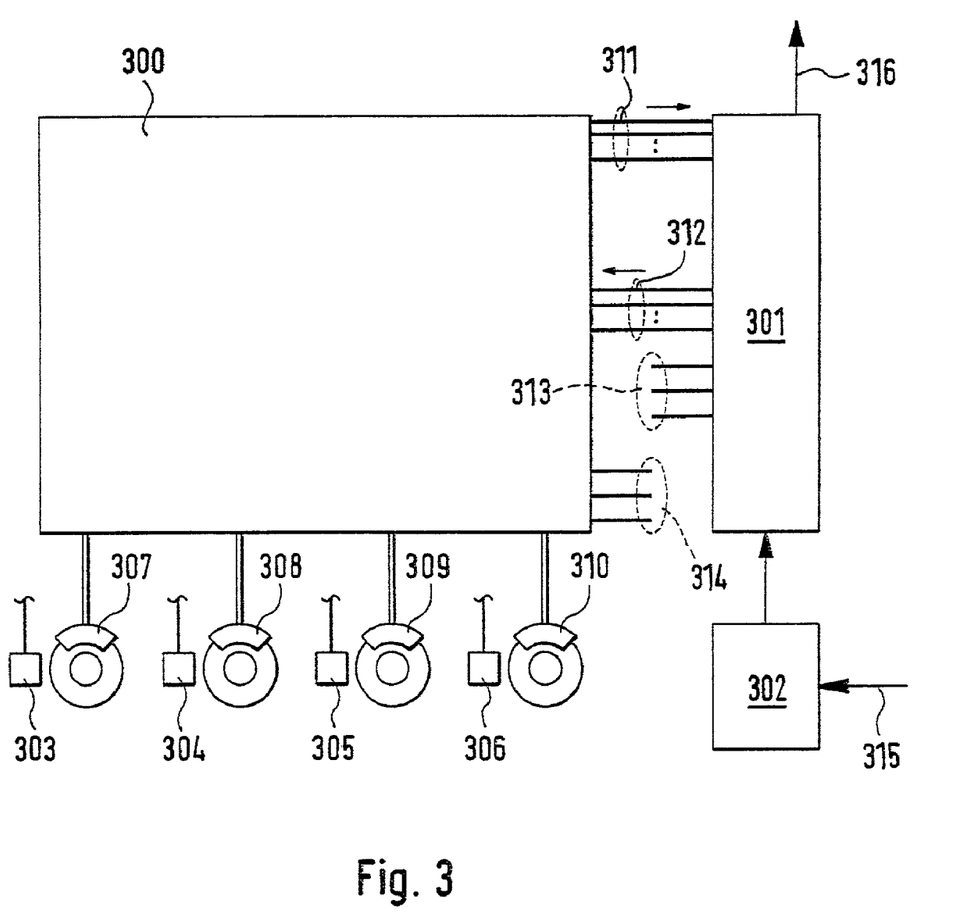
FIG. 3 shows in example brake system with a brake hydraulic system and control unit(s).

The brake systems illustrated in FIGS. 1 and 2 are examples of the brake systems that can be used in a vehicle. To this end, FIG. 3 shows a more general diagram. The brake systems shown as examples in FIGS. 1 and 2 are optionally included in block 300. Only wheel brakes 307 to 310 are shown again separately. Since each wheel brake 307 to 310 is assigned to one wheel, the latter are assigned wheel rpm sensors 303 to 306 which can be used according to the present invention. Reference to the position of respective wheel brake 307 to 310 in the vehicle, as was done in FIG. 2, is omitted here, because no specific arrangement is necessary for many of the methods and the system according to the present invention. Therefore, depending on the method used, all conventional brake circuit divisions may be used, e.g., axially, crossed, parallel, single wheel braking, etc.

Block 301 shows a control unit for the brake system as mentioned previously. Block 302 shows another logic unit or another control unit, e.g., a motor control unit and/or a higher-level logic unit, e.g., for ABS, ASR, FDR, etc. Output signals 316 from control unit 301 are sent to another control unit over a diagnostic line, for example. Systems 301, 302, which are shown here separately, and an optional diagnostic unit over line 316 may be combined in any desired manner, even in one control unit. It is also possible to combine blocks 301 and 302 in one control unit. Input quantities into higher-level logic unit 302 (e.g., ABS, ASR, FDR) are represented in 315. These may include sensor signals or the like. The higher-level logic unit 302 in turn supplies input to brake control unit 301.

The control belonging to the brake system is diagrammed schematically as block 301. The individual valves of brake system 300 and the motors of the individual pumps used in the brake system, inter alia, are connected to control 301. All these actuators and all others are controlled over line bundle 312. The sensors already shown in FIGS. 1 and 2 as well as rpm sensors 303 to 306 shown here for the first time send their signals over line bundle 311, for example, to control 301 and at least one optional temperature sensor integrated into the hydraulic unit also sends its signals to control 301. In addition, at least one temperature sensor may be arranged in thermal contact with part of control 301. Additional lines needed for other sensors and actuators or display elements are illustrated by line bundles 313 and 314. Output quantities from the brake system supplied over line 314 can also be fed into higher-level logic unit 302 (see 315). At least one other temperature sensor which may optionally be provided externally to the system could be connected to control 301 over line bundle 313. The temperature sensor(s) is/are arranged in thermal contact with at least part of the electronic circuit and/or the brake system. Instead of or in conjunction with the temperature sensors, methods of determining the temperature such as estimation or analysis of functional temperature-dependent changes may also be used. In general, the precise number of lines and terminals will depend on the respective embodiment and the extent of function of the motor vehicle. Instead of a plurality of lines, a bus system could also be used for 311, 312, 313, 314, 315, 316 and the connection of the control units.

Valves are pre-energized, for example, by the control to achieve a more rapid reaction in case of need, and the inlet valves are opened to build up a brake pressure. In addition, the pumps present in the brake system can be driven in cycles by the control by using a preselectable mark-to-space ratio, e.g., to guarantee a low noise generation. Controlled braking, e.g., braking of individual wheels or both axles at the same time is also possible through the brake system or the control unit. Likewise, a high brake pressure and/or system pressure which is even higher than that selected by the driver can be set with EHB and HBV if the situation requires.

Figure 4:
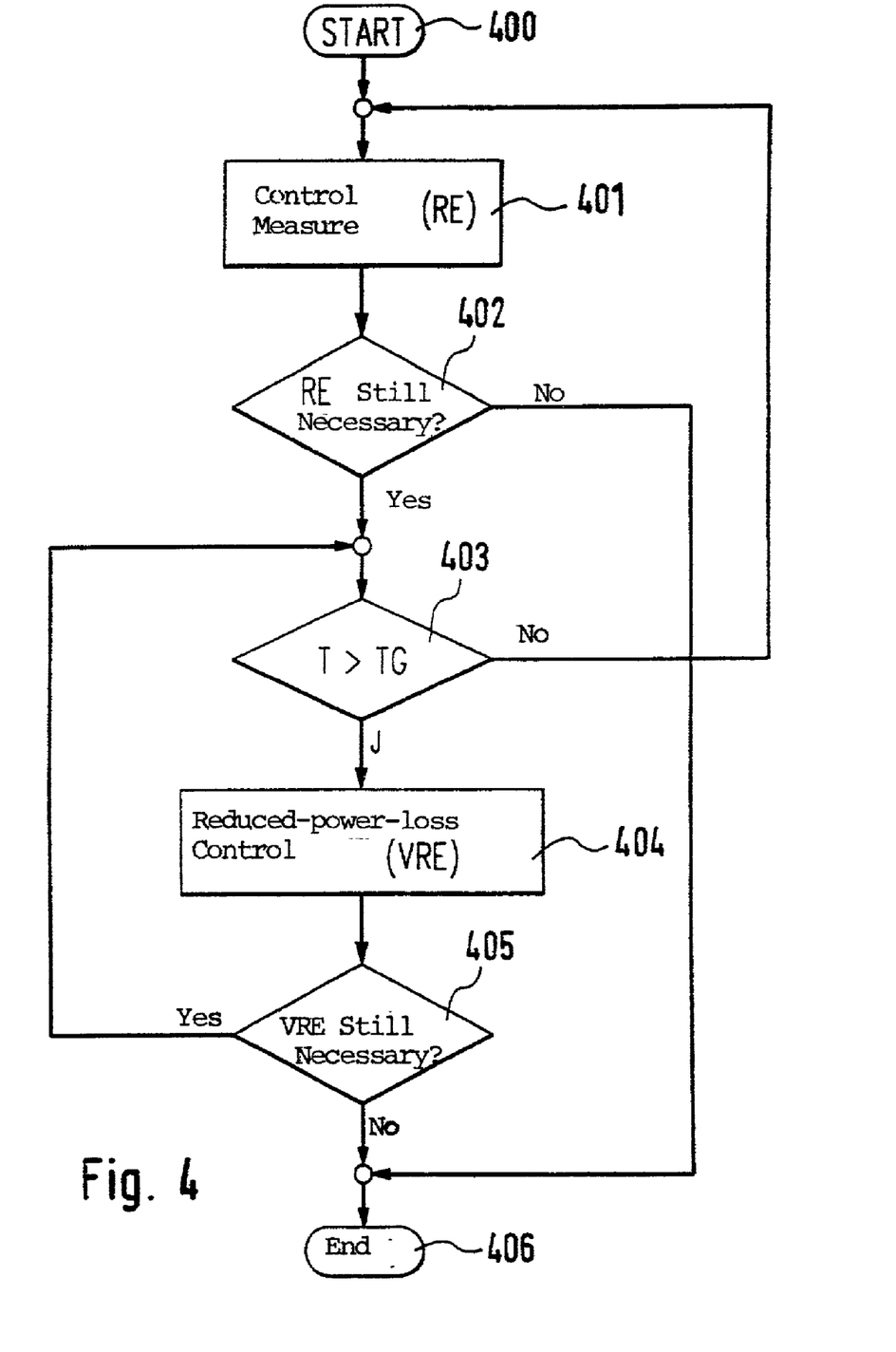
FIG. 4 is a flow chart of a method according to the present invention.

These control measures and others used by ASR, ABS, FDR and ACC in combination with EHB and HBV and other brake systems, for example, lead to heating of the components in the control unit. Therefore, a control VRE with reduced power loss is used in FIG. 4, depending on at least one temperature limit. Starting from block 400 (start), a certain control measure RE or different control measures RE is or are implemented, depending on the respective functionality (e.g., ASR, FDR, ABS, ACC, etc.) in block 401. Depending on the type and complexity of the control used, there may be one or more control measures RE. After a predetermined time and/or a certain control progress and/or a time in which a control measure is imminent, a query is issued in block 402 to determine whether control measures RE used are still needed. If not, it goes immediately to block 406, the end of the process. If control measures RE, i.e., the control measure or control method used (e.g., ABS, ASR, FDR, ACC, etc.), must still be maintained due to the situation, a query is issued in block 403 to determine whether temperature T of at least part of the electronic circuit is above a predetermined temperature limit Tg. Temperature T can be determined by temperature detection means which are in thermal contact with at least part of the electronic circuit and/or by a temperature estimation model and/or by analysis of typical functional temperature-dependent changes (e.g., vibration response of pressure regulators at high temperature). If temperature T thus determined or detected is not above temperature limit Tg, required control measures RE from block 401 are continued as intended. If temperature T detected exceeds predetermined temperature limit Tg in block 403, reduced-power-loss control VRE is introduced in block 404. In reduced-power-loss control VRE, the power loss and thus the heat dissipation of the at least one part of the electronic circuit on the one hand and the driven actuators and consumers on the other hand are reduced through various measures and functionalities to be described below. In block 405, a check is performed to determine whether reduced-power-loss control VRE is still needed due to the situation. VRE can take place independently or in combination with the control initiated originally in block 401. If a control measure is still needed (VRE independently or in combination with ABS, ASR, FDR, ACC or EHB, HBV, etc.), the temperature is tested against temperature limit Tg again in block 403. If the control can be terminated on the basis of the situation, this also leads to process end 406. In block 404, the various measures for reducing the power loss in the control unit and in the entire brake system may be used in any desired combination, depending on the situation and the brake system or the vehicle used.

Figure 5:
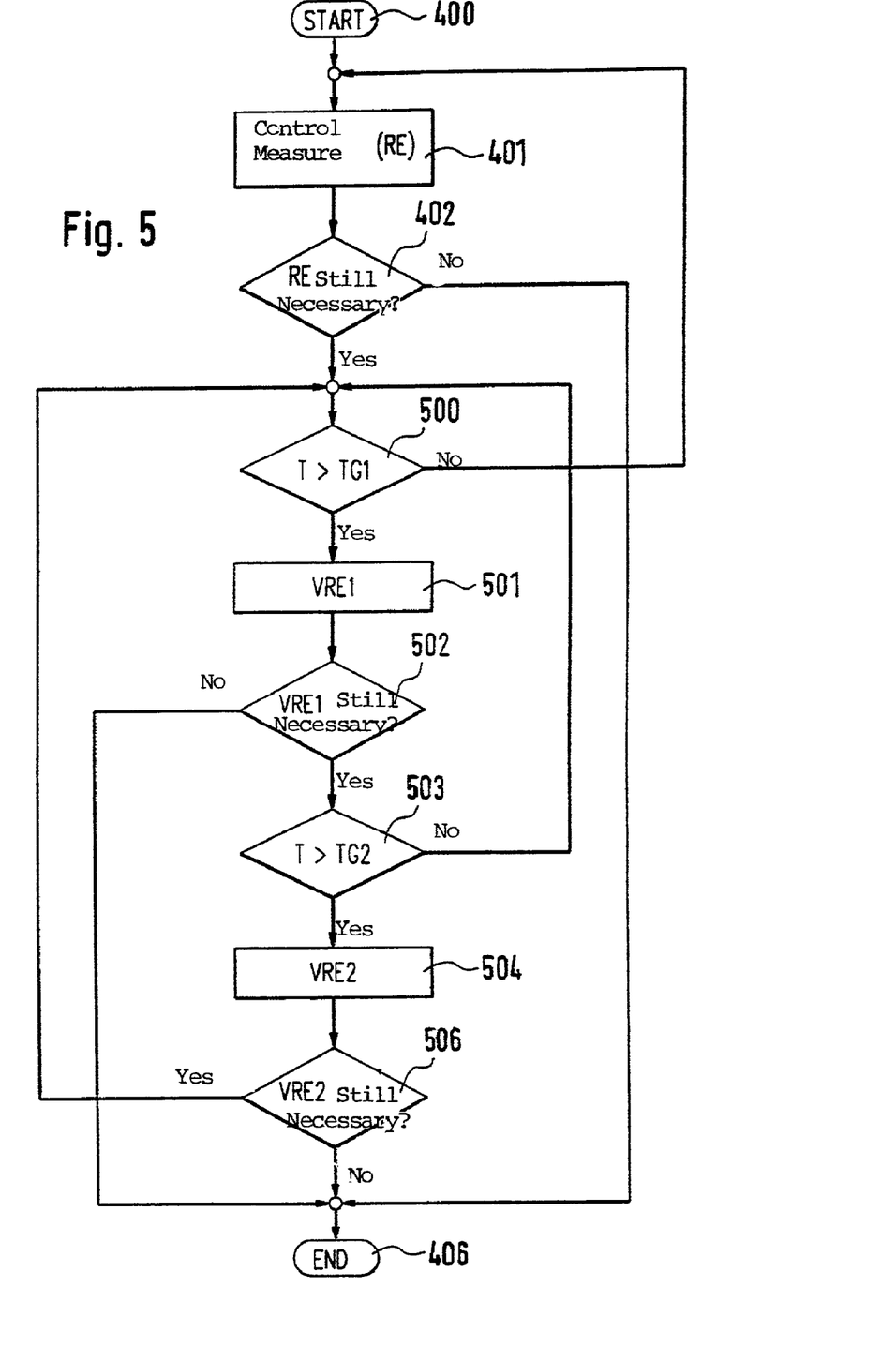
FIG. 5 illustrates the use of multiple temperature thresholds, and an allocation of functions associated with it or an allocation of at least one control with reduced power loss.

FIG. 5 illustrates the use of two temperature limits Tg1 and Tg2. The flow chart shown here can be expanded by two to any desired number of temperature limits Tgn as threshold values with respective reduced-power-loss controls VREn.

Starting again from the start in block 400, control measures RE are again performed by, for example, ASR, ABS, FDR, ACC, etc. in block 401, depending on the situation. As in FIG. 4, after a predetermined period of time or a system-imminent period of time or with the progress of the control sequence after a certain control progress, a query is performed in block 402 to determine whether control measures RE are still needed due to the situation. If this is not the case, the process goes immediately to block 406 for the end of the process. If control measure RE is still needed due to the situation, measurable temperature T of at least part of the electronic circuit is checked in block 500 to determine whether it is greater than a first predetermined temperature limit Tg1. If not, the process continues with original control measures RE. If temperature T exceeds first temperature limit Tg1, a first power-loss-reduced control VRE1 is initiated in block 501. At least one of the measures or functions described below is contained therein. In block 502, a query determines whether control strategy VRE1 is still needed. Control VRE1 may take place independently or in combination with the control initiated originally in block 401. If control is still needed (VRE1 independently or in combination with, for example, ABS, ASR, FDR or EHB, HBV, etc.), the temperature is tested against another temperature limit Tg2 in block 503. If further control is not necessary due to the situation, this leads to the end of the process in block 406. If the control is still needed, a query in block 503 determines whether temperature T exceeds a second temperature limit Tg2. If this is not the case, a check is again performed in block 500 to determine whether temperature T still exceeds a first temperature limit Tg1.

If second temperature limit Tg2 in block 503 is exceeded, a second power-loss-reduced control VRE2 is initiated in block 504. Here again, at least one of the functions or measures explained below is implemented. Starting from control VRE2, a check is performed in block 506 to determine whether or not another control measure is needed. Control VRE2 may take place independently or in combination with the control initiated originally in block 401 and with control VRE1 implemented in block 501. If no further control is necessary in this connection, this leads to the end of the process in block 406. If control is still needed in general, a check is again performed to determine whether temperature T exceeds a first temperature limit Tg1. If temperature T has cooled down enough because of the control measures implemented, so that temperature T does not exceed first temperature limit Tg1, then the system returns to the standard control measures RE required for that situation in block 401, and the control is terminated in block 402 if control measure RE is no longer needed due to the situation.

To prevent rapid switching back and forth (toggling) at the temperature thresholds, i.e., to avoid switching between the control methods, a hysteresis may be provided to advantage. On reaching the respective temperature limit, it is possible to switch to the respective control method, but there is a certain temperature difference when the temperature drops below a temperature limit, i.e., the system switches back somewhat later. Thus, the ON and OFF temperature thresholds of a respective control are not identical.

Example measures or functions and methods of reducing the power loss are described below. These may be used and combined as desired, for example, in the above-mentioned controls VRE, VRE1 and VRE2 or VREn. To this end, heat generating controls in a brake system are operated in a condition in which the power loss is as low as possible. These measures are discussed further as examples for the brake systems illustrated in FIGS. 1 and 2. However, most can be used in a general brake system as illustrated schematically in FIG. 3.

If the brake system from FIG. 1 is used in block 300 in FIG. 3, this yields the following measures for achieving lower heating.

The cycled control of pump turbine 108 or pump motor 107 is not described here further. There is continuous heating of the motor due to the fact that an effective voltage is constantly being applied or a medium current is constantly being supplied to the pump motor in this cycled operation, and there is also continuous heating of the control unit due to the fact that the control is constantly active. Due to the frequent switching operations, the switching transistors, for example, entail the resulting flank power loss in the transition from conducting to nonconducting, thus resulting in heating. Likewise, there is great heating due to the starting currents which often occur in cycled control. Instead of this, as needed or with at least one triggering condition, which may occur when dropping below a certain brake pressure or system pressure threshold and/or due to control input of the higher-level logic unit from FIG. 3 (e.g., ABS, ASR, FDR, ACC, etc.) and/or due to preselection of the brake system (e.g. HBV, EHB, etc.), the pump is continuously driven or pump motor 107 receives electric power or voltage until the triggering condition has subsided again and/or a predetermined period of time has elapsed and/or the process is ended by the control or at least one additional condition. Then the flank power loss, like the starting currents, occurs much less frequently with the continuous control, which is performed as needed, in comparison with cycled operation, so this is better from a thermal standpoint.

In addition, a temperature reduction can also be achieved by specific brake pressure control.

When the vehicle is at a standstill, the brake pressure is reduced to the required extent which is sufficient to prevent the vehicle from rolling away. The brake pressure can be reduced, for example, by opening the outlet valves or quickly through the optional relief valves 1150 and 1160. The required brake pressure can be adjusted by wheel rpm sensors 303 to 306, for example. If at least one wheel rpm sensor 303, 304, 305, 306 indicates even the least movement of a wheel, the brake pressure in wheel brakes 132 to 135 is increased enough to stop this movement. It is even possible to control only one wheel brake to simply prevent the vehicle from rolling away when at a standstill.

In addition, to reduce power loss, the buildup of brake pressure may take place on only one axle, VA or HA, e.g., when the vehicle is at a standstill or decelerating slightly. This means that in braking at a very low speed or when stopped, either front axle VA or only rear axle HA may be braked optionally by controlling the valves and pump 108, e.g., depending on the possible direction of rolling of the vehicle. This may take place, for example, by controlling the respective pressure modulators or their inlet and outlet valves (e.g., 118, 117 for VR). When respective equalizing valve 125 or 126 is open, the entire axle VA or HA may be braked or driven with only one inlet/outlet valve combination (e.g., 122, 121).

Thus in general, even in normal braking operations, e.g. at higher speeds, entire front axle VA may be braked, i.e., both wheel brakes 132 and 133 can be put under pressure, for example, by inlet/outlet valve combination 118/117 and equalizing valve 125 in the open position, taking safety aspects into account. Generation of heat is reduced due to the fact that fewer of the valves need be driven than would otherwise be necessary due to the use of fewer consumers on the one hand and due to the reduced control complexity on the other hand.

Another measure is to lower the total system pressure, which can be detected, for example, by a pressure sensor 109 or an estimation model. Thus, pump 108 (supercharge pump) must pump against a lower pressure, thereby reducing its power loss.

Another possibility of reducing power loss is to limit the functionality with respect to the valve control. First, pre-energization of the control valves, i.e., the valves used for pressure modulation, namely valves 117, 118 here, for example, which permit a faster dynamic response, in the case of the pressure modulator for wheel brake VR 132, is reduced, in which case a slightly slower dynamic response of the pressure regulator or pressure modulator muse be accepted. Likewise, energization of the switching valves, e.g., block valves 111, 112, may be lowered, although taking into account the pressure differences prevailing at the valves, these differences being detectable by pressure sensors 110 and 129, 130, 136 and 131, for example. Finally, the respective pressure regulator can be operated only with nonenergized equalizing valve 125 or 126, because these valves are open when not energized.

This may lead, for example, to a sequential shutdown of all individual wheel functions, such as brake force distribution depending on transverse force, ASR, ABS, FDR. Due to the partial reduction in the extent of function and the resulting reduced number of control measures or the reduction in the duration of the control measures, the evolution of heat in the control unit and in the environment of the control unit, especially in the brake system, can be reduced.

Finally, as another measure, detection of the driver's braking request can be modified to the extent that the volume consumption of pressure medium is minimized. This may be accomplished, for example, by a delayed pressure buildup and/or pressure reduction in rapidly changing brake pedal movements, because this prevents unnecessary or too frequent controlling of valves and pump. Taking safety limits into account, the delay time in the pressure buildup and/or pressure reduction can be predetermined up to a maximum limit or corrected in the course of one of the methods according to FIG. 4 or 5.

Likewise, a temperature reduction can be achieved with these measures even with hydraulic power-assisted braking, assuming the brake system from FIG. 2 in block 300 in FIG. 3.

Here again, the cycled control, for example, of pump 203 (return pump) or pump motor 202 is not described here further. There is continuous heating of the motor due to the fact that an effective voltage is constantly being applied or a medium current is constantly being supplied to the pump motor in this cycled operation, and there is also continuous heating of the control unit due to the fact that the control is constantly active. Instead of this, as needed or with at least one triggering condition, which may occur when dropping below a certain brake pressure or system pressure threshold and/or due to a control input of the higher-level logic unit from FIG. 3 (e.g., ABS, ASR, FDR, ACC, etc.) and/or due to preselection of the brake system (e.g., HBV, etc.), the pump is continuously driven or pump motor 202 receives electric power or voltage until the triggering condition has subsided again and/or a predetermined period of time has elapsed and/or the process is ended by the control or at least one additional condition. Here again, as explained above, the flank power loss, like the starting currents, occurs much less frequently with the continuous control, which is performed as needed, in comparison with cycled operation, so this is better from a thermal standpoint. The same is true of any pump also present in the brake circuit, such as supercharge pump 200.

In addition, a temperature reduction can be achieved similarly through specific brake pressure control.

When the vehicle is at a standstill, the brake pressure is reduced to the required extent which is sufficient to prevent the vehicle from rolling away. The brake pressure can be reduced, for example, by opening outlet valves 211 and/or 212 (similarly 211*a*, 212*a*). The required brake pressure can be adjusted, for example, by wheel rpm sensors 303 through 306. If at least one wheel rpm sensor 303, 304, 305, 306 indicates even the slightest movement of one wheel, the brake pressure in wheel brakes 223 through 226 is increased enough to stop this movement. It is even possible to control only one wheel brake, e.g., 223, to simply prevent the vehicle from rolling away when at a standstill.

In addition, to reduce power loss, the buildup of brake pressure may take place on only one axle, VA or HA, when the vehicle is at a standstill or decelerating slightly, e.g., with a brake circuit division according to axles. Then front axle VA contains wheel brakes 223 and 224, for example, and the rear axle has wheel brakes 225 and 226. This means, for example, that optionally either front axle VA or only rear axle HA is braked with braking at very low speeds or with a slight deceleration or at a standstill, e.g., depending on the possible direction in which the vehicle might roll, e.g., due to a pressure buildup in only one brake circuit. This can be accomplished by controlling the respective inlet valves and outlet valves (e.g., 209 through 212 for VA) and reversing valve (205) and booster valve or intake valve (204). When inlet valves 209 and 210 are open, entire axle VA (or HA) can be driven or braked with only one reversing valve 205 if a brake pressure has already been built up by controlling intake valve 204. For the case of pressure reduction, this applies accordingly with unenergized outlet valves 211 and 212.

Thus, in general, even in normal braking operations, e.g., at higher speeds, entire front axle VA may be braked, i.e., both wheel brakes 223 and 224 can be put under pressure, for example, by inlet and outlet valves 209 through 212 in the unenergized state with reversing valve 205, taking safety aspects into account. The same thing applies to the pressure reduction at this point as explained above, e.g., when using FDR or ABS. Generation of heat is reduced due to the fact that fewer of the valves need be driven than would otherwise be necessary due to the use of fewer consumers on the one hand and due to the reduced control complexity on the other hand.

Another measure is to lower the total system pressure, which can be detected, for example, by an estimation model or a pressure sensor. Thus, pump 203 (return pump) must pump against a lower pressure, thereby reducing its power loss.

Another possibility of reducing power loss is to limit the functionality with respect to the valve control. First, the pre-energization of the control valves, i.e., the valves used for pressure modulation, namely valves 209 and 211 here, for example, which permit a faster dynamic response, in the case of the pressure modulator for wheel brake 223, is reduced, in which case a slightly slower dynamic response must be accepted in the pressure buildup. Likewise, energization of reversing valves 205, 205*a* and booster valves and intake valves 204, 204*a* may be lowered, although taking into account the pressure differences prevailing at the valves, these differences being detectable by pressure sensor 214 and/or by estimation of the pressure, for example.

This may lead, for example, to a sequential shutdown of all individual wheel functions, such as brake force distribution depending on transverse force, ASR, ABS, FDR. Due to the partial reduction in the extent of function and the resulting reduced number of control measures or the reduction in the duration of the control measures, the evolution of heat in the control unit and in the environment of the control unit, especially in the brake system, can be reduced.

Finally, as another measure, detection of the driver's braking request can be modified to the extent that the volume consumption of pressure medium is minimized. This may be accomplished, for example, by a delayed pressure buildup and/or pressure reduction in rapidly changing brake pedal movements, because this prevents unnecessary or too frequent controlling of valves and pump. Taking safety limits into account, the delay time in the pressure buildup and/or pressure reduction can be predetermined up to a maximum limit or corrected in the course of one of the methods according to FIG. 4 or 5.

In general, it can be concluded that the measures described above can be used generally in all brake systems with a design comparable to that in the embodiments, as explained at the beginning, and thus there is a good possibility of reducing the power loss in the brake system, in particular in the control unit, and thereby reducing heating.

What is claimed is:

1. A method of controlling or regulating operating sequences in a brake system of a vehicle, the brake system including an electronic circuit and consumers, the consumers including at least one arrangement for conveying a pressure medium and at least one cutoff device for at least one of inflow, outflow, and through flow of the pressure medium, the brake system further including a temperature detector arranged in thermal contact with one of i) at least a portion of the electronic circuit, and ii) at least a portion of the brake system, the method comprising:

determining a temperature value representing a temperature of the one of i) at least a portion of the electronic circuit, and ii) at least a portion of the brake system;

determining whether the temperature value exceeds at least one of a plurality of threshold values, wherein each of the plurality of threshold values is associated with at least one assigned measure; and for each one of the plurality of threshold values exceeded, initiating the at least one assigned measure, wherein the at least one assigned measure includes one of: i) shutting down selected ones of the consumers, and ii) driving selected others of the consumers.

2. The method according to claim 1, wherein a buildup of pressure occurs only on one axle.

3. The method according to claim 1, further comprising:
   delaying at least one of a pressure buildup and a pressure reduction in response to rapidly changing brake pedal movements.

4. A system for controlling or regulating operating sequences in a brake system of a motor vehicle, comprising:
   an electronic circuit which controls or regulates the operating sequences;

an arrangement for conveying a pressure medium in the brake system;

at least one cutoff device for at least one of: i) inflow, ii) outflow, and iii) through-flow, of the pressure medium;

a temperature detector arranged in thermal contact with at least one of: i) a portion of the electronic circuit, and ii) a portion of the brake system, the at least one temperature detector determining a temperature value representing a temperature of the at least one of: i) the portion of the electronic circuit, and ii) the portion of the brake system; and an arrangement determining whether the temperature value exceeds at least one of a plurality of threshold values, wherein each of the plurality of threshold values is associated with at least one assigned measure, and for each one of the plurality of threshold values exceeded, implementing the at least one assigned measure, wherein the at least one measure includes at least one of the following:

i) a reduction in at least one pressure prevailing in the pressure medium in the brake system, ii) shutting down selected ones of the consumers, iii) driving selected others of the consumers, iv) reducing a pre-energization of at least one control valve, and v) reducing an energization of at least one reversing valve.

5. The method according to claim 4, wherein the reduction in at least one pressure prevailing in the pressure medium in the brake system is sufficient to prevent the motor vehicle from rolling away.

* * * * *